United States Patent [19]

Foster et al.

[11] Patent Number: 4,737,227

[45] Date of Patent: Apr. 12, 1988

[54] AXIAL LEADED COMPONENT CENTERING DEVICE AND METHOD OF CENTERING COMPONENTS

[75] Inventors: Roger T. Foster, Vestal; Frank J. Orzelek, Binghamton, both of N.Y.

[73] Assignee: Universal Instruments Corporation, Binghamton, N.Y.

[21] Appl. No.: 833,283

[22] Filed: Feb. 27, 1986

[51] Int. Cl.<sup>4</sup> .................. B65G 47/74; B65G 47/82; B65G 47/84

[52] U.S. Cl. ......................... 156/297; 156/296; 156/552; 156/556; 156/558; 198/456; 198/636

[58] Field of Search ............... 156/552, 556, 558, 557, 156/296, 297; 198/456, 636, 457, 458, 633; 53/591

[56] References Cited

U.S. PATENT DOCUMENTS

| | | | |
|---|---|---|---|
| 2,675,953 | 4/1954 | Van Poolen | 198/626 X |
| 3,701,233 | 10/1972 | Luckman, Jr. | 53/591 |
| 4,021,292 | 5/1977 | Bates et al. | 156/552 |
| 4,270,651 | 6/1981 | Regard et al. | 198/456 |
| 4,311,544 | 1/1982 | Salopek et al. | 156/552 X |

Primary Examiner—Robert A. Dawson
Assistant Examiner—Jeff H. Aftergut
Attorney, Agent, or Firm—Franklin D. Wolffe; Morris Fidelman

[57] ABSTRACT

Electronic components, such as resistors with bodies of different lengths and axially protruding leads, are fed along a feed path and between a pair of rotating members. Each rotating member has fingers that are flexed away from the feed path for reception of the component bodies between cooperating fingers of the rotating members, after which these fingers close onto the bodies to center them on the feed path.

An opposed pair of the flexible fingers, one from each rotating member, retain each component in a centered condition along the feed path until corresponding leads of consecutive components are taped together at a subsequent taping station to form a ladder-like belt of components.

18 Claims, 4 Drawing Sheets

AXIAL LEADED COMPONENT CENTERING DEVICE AND METHOD OF CENTERING COMPONENTS

BACKGROUND OF THE INVENTION

The use of belted electronic components (resistors, disc capacitors, diodes, etc.) is one of the most convenient handling techniques for the electronics industry. The leads of components are pre-straightened and generally aligned and equally spaced on the belt so that they may be fed directly into insertion machines or testing devices without intermediate handling. However, the speed and efficiency of subsequent operations using belted tapes is reduced and complexity is increased when the components are not precentered on the taped belt.

U.S. Pat. Nos. 3,971,193 and 4,021,292 disclose taped belt electronic component centering devices in which spring-loaded fingers center electronic components that are being fed by a conveyor to a component taping means, and the component opens the centering fingers. U.S. Pat. No. 4,270,651 discloses a means for actuating the centering fingers of an electronic component feeding and taping machine. More specifically, a rotating arcuate cam surface opens and controls the rate of closure of centering fingers in timed relation with the feeding of the components to the fingers, in order to prevent bending delicate leads while providing the centering function.

However, non of the prior art provides for or ensures that the component remains centered during transfer from the centering station to a subsequent handling station such as a lead taper. Thus, lateral shifting of the components relative to the feed path can occur, resulting in the need for recentering of the components prior to insertion or requiring greater tolerances in subsequent operations such as lead forming and inserting.

Accordingly, it is an object of the instant invention to provide a method and apparatus for centering such components, wherein a centered condition is maintained until subsequent handling such as taping of the components is performed.

These and other objects of the invention will become apparent from the following detailed disclosure.

SUMMARY OF THE INVENTION

In a preferred embodiment of the invention, electronic components, such as resistors with bodies of different lengths and axially protruding leads, are fed along a feed path and between a pair of rotating members. Each rotating member has fingers that are flexed away from the feed path for reception of the component bodies between cooperating fingers of the rotating members, after which these fingers close onto the bodies to center them on the feed path.

An opposed pair of the flexible fingers, one from each rotating member, retain each component in a centered condition along the feed path until corresponding leads of consecutive components are taped together at a subsequent taping station to form a ladder-like belt of components.

DETAILED DESCRIPTION OF THE INVENTION

Figure 1:
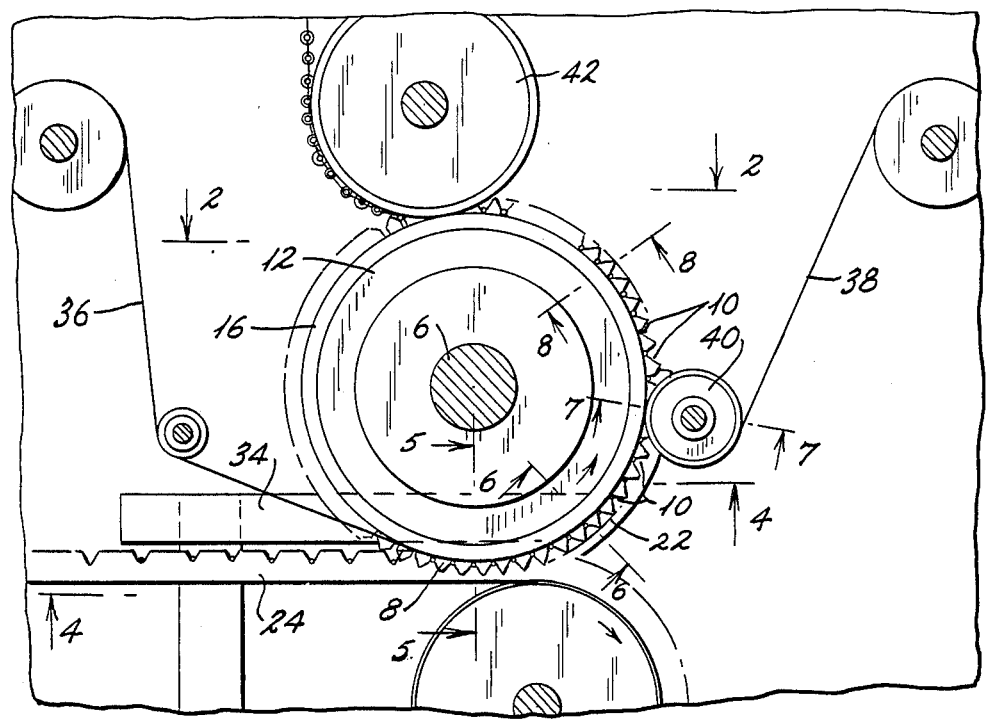
FIG. 1 is a front elevation of the centering device being used with a taping device.
Figure 2:
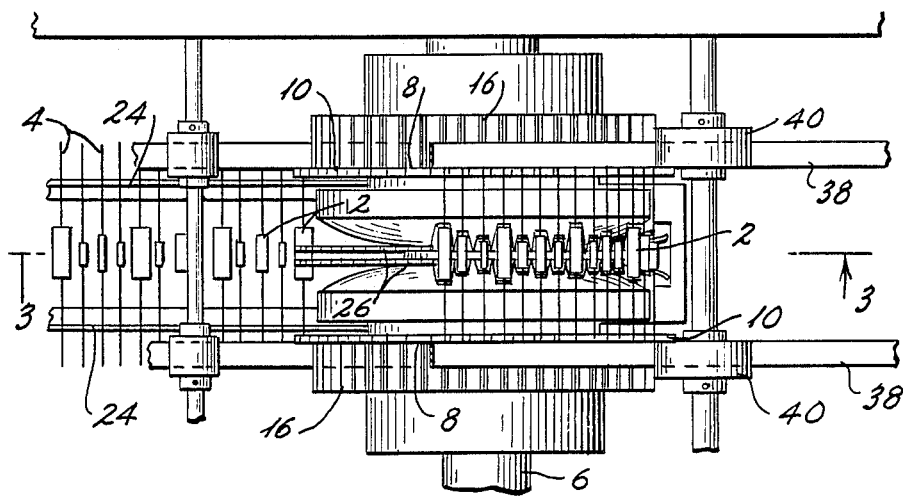
FIG. 2 is a top plan view generally in the direction of arrows 2—2 of FIG. 1.

Referring to the drawings, components 2 are supported by their leads 4 in the notches of a pair of conveyor belts or chains 24 carrying the components to the centering device of the invention. A pair of arcuate guide ramps 22 cooperate with the notches 10 in a pair of indexing wheels 8 to remove the components from conveyor 24 and guide them past a presser wheel 40 at a taping station.

The indexing wheels 8 are coaxially arranged on hub 6 with tape guide wheels 12, flexible centering discs 26, and backer wheels 18. Each centering disc 26 comprises a plurality of radially protruding fingers 28 with notches 30. A wedge 34 is positioned so as to spread successive fingers 28 to a flexed condition during rotation of the discs 26, while also providing for successive controlled closing of such flexed fingers 28 into engagement with the component bodies 2 for centering thereof along the feed path. Tape guide wheels 12 have flexible peripheral portions 14 with notches 16 around which a first tape 36 is guided in preparation for taping the leads of centered components.

Figure 5:
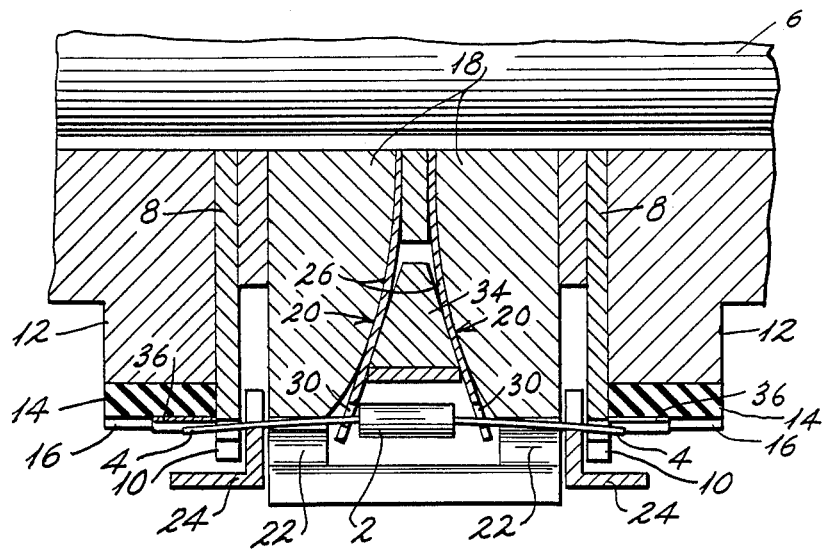
FIG. 5 is a cross-section, as generally viewed in the direction of arrows 5—5 of FIG. 1.
Figure 6:
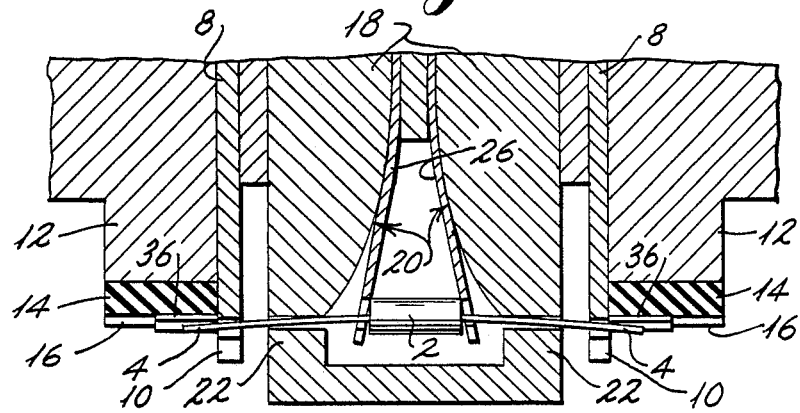
FIG. 6 is a cross-section, as generally viewed in the direction of arrows 6—6 of FIG. 1.
Figure 9:
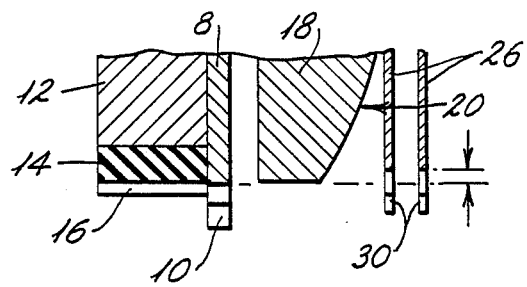
FIG. 9 is a partial cross-sectional view illustrating the geometrics which provide bowing of a lead in order to prevent contact thereof with a first tape until a second tape has been applied.
Figure 7:
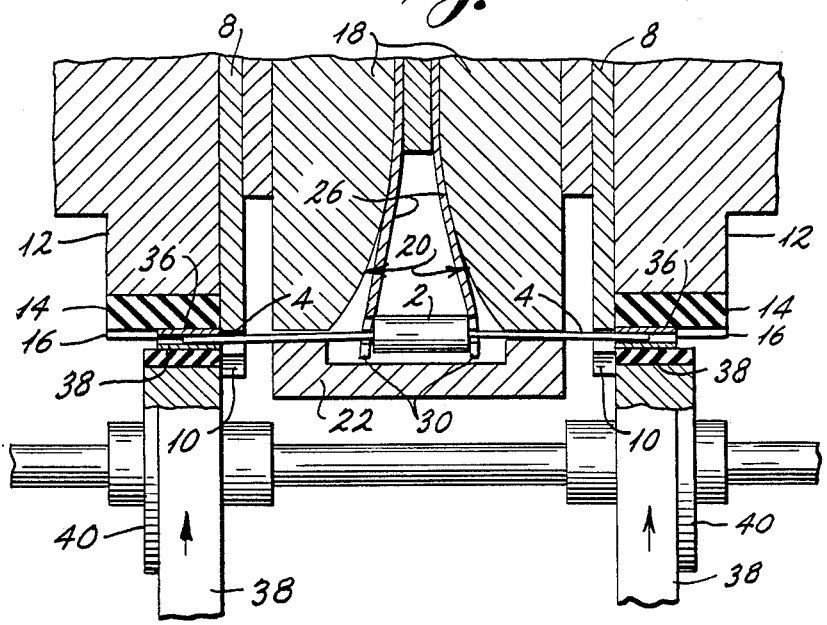
FIG. 7 is a cross-section, as generally viewed in the direction of arrows 7—7 of FIG. 1.
Figure 8:
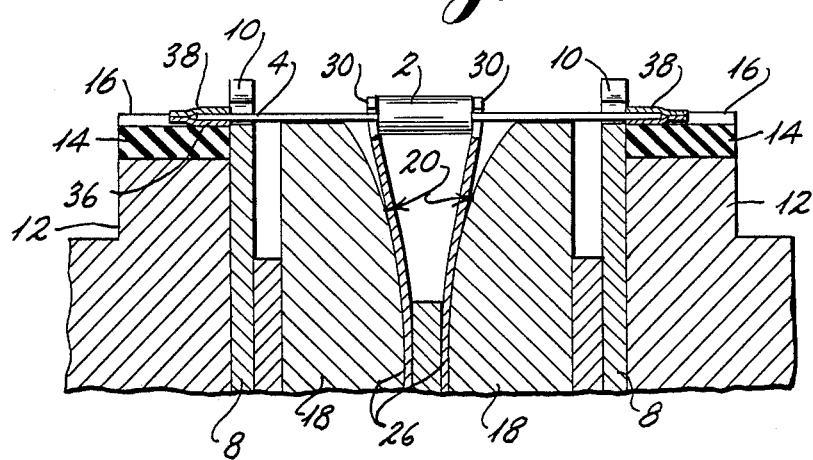
FIG. 8 is a cross-section, as generally viewed in the direction of arrows 8—8 of FIG. 1.

As seen in FIGS. 5, 6, and 9, the geometries of the structure of the device provide for bowing of the component leads 4 prior to centering of the components on the feed path. The particular structure of the centering device maintains the components in a centered condition until the second tape 38 is pressed into engagement with the first tape 36 by presser wheel 40.

Figure 3:
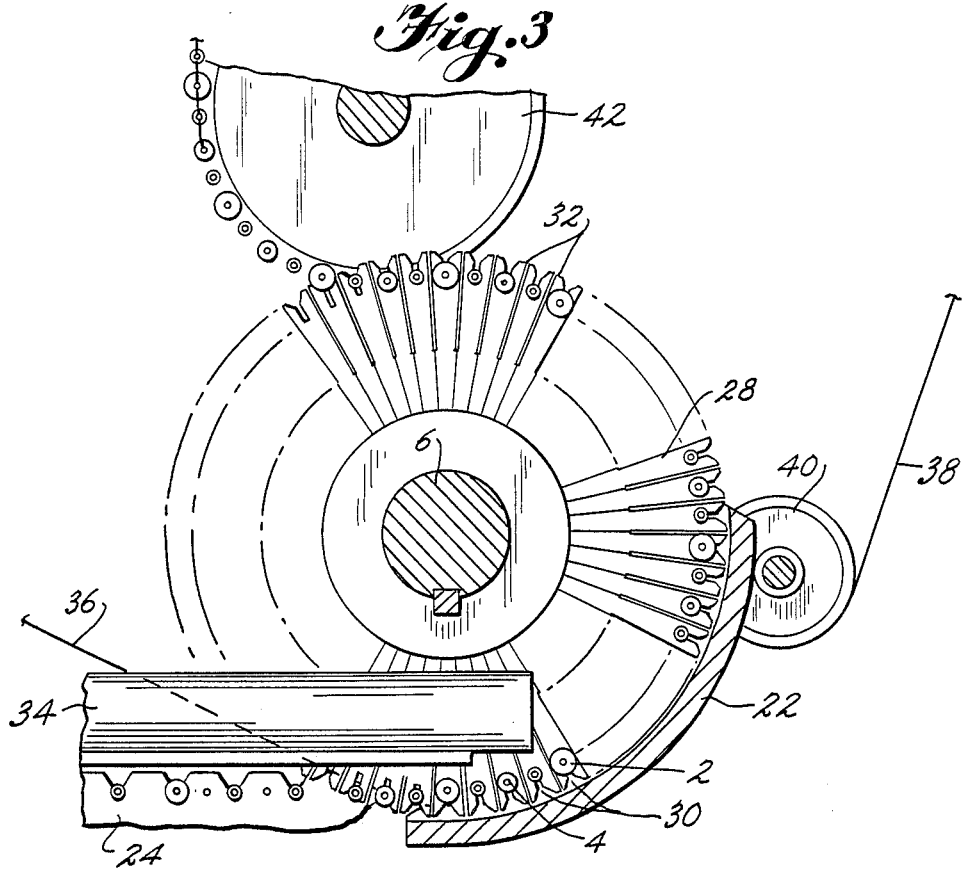
FIG. 3 is a cross-section as generally viewed in the direction of arrows 3—3 of FIG. 2.
Figure 4:
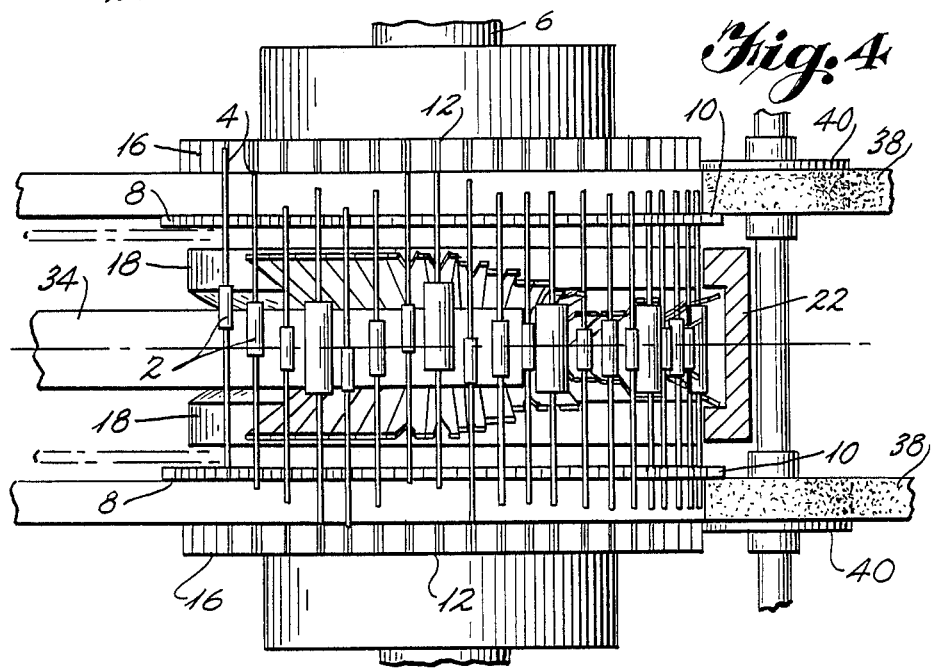
FIG. 4 is a bottom plan view, partially in cross-section, as viewed generally in the direction of arrows 4—4 of FIG. 1.

As seen in FIG. 3, the individual fingers 28 of the flexible disc 26 are spaced therebetween at 32 so as to ensure that there is no interference between the centering fingers for one component and an adjacent component.

Although a subsequent component handling station is illustrated herein as being a taping station, it is also contemplated that the flexible centering disc could be used in another context such as direct feed to an insertion machine. A particular advantage of the instant invention is the continuous centering of a series of components and maintenance of the centered condition during transfer of the components to a subsequent handling station.

Although the invention has been illustrated as used in the centering of electrical components having leads, it is also contemplated that components without leads, whether or not they be electrical in nature, could also be centered with the rotatable disc. Still further, it is contemplated that only one flexible disc could be used to engage one end of a component to urge the other end of the component against a fixed guide, although such an arrangement would only be useful in centering components of the same length or in locating only one edge of components of varying lengths.

Other modifications of the instant invention are also contemplated to be within the scope of the instant invention. For instance, the flexible discs could be mounted coaxially in other than a parallel relationship such that the wedge 34 may not be needed when feeding the components between the flexible fingers prior to centering. In such a modification, the components could be fed into engagement with the flexible fingers causing them to flex, and the flexed fingers could still control and maintain the component in a centered condition until a subsequent, nearby station is reached.

It will thus be seen that the objects set forth above, among those made apparent from the preceding description are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A method of centering components upon a feed path, comprising the steps of:
    providing a pair of cooperating disc-like centering members rotating about a common axis and each being flexible at least at a peripheral edge thereof;
    presenting said components sequentially between cooperating portions of the peripheral edges of said disc-like rotating centering members and closing said cooperating portions onto and engaging said components with said cooperating flexible peripheral edges such that components of different body lengths are centerable by said centering means; and
    centering components upon a feed path at a centering station by said engaging and closing wherein uncentered components are displaced laterally of said feed path, as needed for centering.

2. A method as in claim 1 and further comprising the step of:
    spreading apart said cooperating portions of flexible peripheral edges in order to receive said components therebetween during said presenting.

3. A method as in claim 2 and further comprising the step of:
    flexing said cooperating portions to perform said spreading.

4. A method as in claim 1 and further comprising the step of:
    retaining each component in a centered condition upon said feed path during transfer from said centering station to a subsequent component handling station, said retaining being performed by said centering members.

5. A method as in claim 1 and further comprising the step of:
    controlling said closing and engaging of said cooperating portions onto said components.

6. A method as in claim 3 and further comprising the step of:
    relaxing said flexing of said cooperating portions in order to perform said closing.

7. An apparatus for centering components upon a feed path, and comprising:
    a pair of cooperating disc-like centering members rotating about a common axis and each being flexible at least at a peripheral edge thereof;
    means for presenting said components sequentially between cooperating portions of the peripheral edges of said disc-like rotating centering members; and
    means for closing said cooperating portions upon and engaging said components by said flexible peripheral edges in order to center components upon said feed path by said closing wherein uncentered components are displaced laterally of said feed path, as needed for centering, such that said flexible edges allow centering of sequentially presented components of various lengths when said lengths are oriented generally laterally of said feed path.

8. An apparatus as in claim 7 and further comprising:
    means for spreading apart said cooperating portions of flexible peripheral edges in order to receive said components therebetween for said presenting.

9. An apparatus as in claim 8 and further comprising:
    means for flexing said cooperating portions to perform said spreading.

10. An apparatus as in claim 7 and further comprising:
    means for retaining each component in a centered condition upon said feed path during transfer from said centering station to a subsequent component handling station, said retaining means comprising said centering members.

11. An apparatus as in claim 7 and further comprising:
    means for controlling said closing and engaging of said cooperating portions onto said components.

12. An apparatus as in claim 9 and further comprising:
    means for relaxing said flexing of said cooperating portions in order to perform said closing.

13. A method of centering components upon a feed path, wherein each of said components has a body and leads extending in generally opposite directions from said body, and comprising the steps of:
    providing a pair of cooperating disc-like members rotating about a common axis and each being flexible at least at a peripheral edge thereof;
    presenting said components sequentially between cooperating portions of the peripheral edges of said disc-like rotating members and closing said cooperating portions onto and engaging said components with said cooperating flexible peripheral edges;
    centering components upon a feed path at a centering station by said engaging and closing wherein uncentered components are displaced laterally of said feed path, as needed for centering;
    applying tape to said leads of each component at a subsequent component handling station while retaining said centered condition and forming a belt of centered components with corresponding leads taped together;
    spacing each of said leads from a corresponding tape during transfer to and prior to said subsequent station; and bowing each of said leads during said transfer in order to accomplish said spacing.

14. A method of centering components upon a feed path, comprising the steps of:
providing a pair of cooperating disc-like members rotating about a common axis and each being flexible at least at a peripheral edge thereof;
presenting said components sequentially between cooperating portions of the peripheral edges of said disc-like rotating members and closing said cooperating portions onto and engaging said components with said cooperating flexible peripheral edges;
centering components upon a feed path at a centering station by said engaging and closing wherein uncentered components are displaced laterally of said feed path, as needed for centering;
controlling said closing and engaging of said cooperating portions onto said components;
providing each of said disc-like members with plural radially extending flexible fingers at said peripheral edges; and
closing corresponding fingers of each disc-like member in unison upon a corresponding component in order to perform said centering.

15. An apparatus for centering components upon a feed path, and comprising:
a pair of cooperating disc-like members rotating about a common axis and each being flexible at least at a peripheral edge thereof;
means for presenting said components sequentially between cooperating portions of the peripheral edges of said disc-like rotating members;
means for closing said cooperating portions upon and engaging said components by said flexible peripheral edges in order to center components upon said feed path by said closing wherein uncentered components are displaced laterally of said feed path, as needed for centering;
means for applying tape to leads of each component at said subsequent component handling station and retaining said centered condition in order to form a belt of centered components with corresponding leads taped together;
means for spacing each of said leads from a corresponding tape during said transfer and prior to said subsequent station; and
means for bowing each of said leads during said transfer in order to accomplish said spacing.

16. An apparatus for centering components upon a feed path, and comprising:
a pair of cooperating disc-like members rotating about a common axis and each being flexible at least at a peripheral edge thereof;
means for presenting said components sequentially between cooperating portions of the peripheral edges of said disc-like rotating members;
means for closing said cooperating portions upon and engaging said components by said flexible peripheral edges in order to center components upon said feed path by said closing wherein uncentered components are displaced laterally of said feed path, as needed for centering; and
means for controlling said closing and engaging of said cooperating portions onto said components, wherein each of said disc-like members comprise plural radially extending flexible fingers at said peripheral edges such that corresponding fingers of each disc-like member close in unison upon a corresponding component in order to perform said centering.

17. A method of centering components upon a feed path, comprising the steps of:
providing a pair of cooperating disc-like centering members rotating about a common axis and each being flexible at least at a peripheral edge thereof;
presenting said components sequentially between cooperating portions of the peripheral edges of said disc-like rotating centering members and closing said cooperating portions onto and engaging said components with said cooperating flexible peripheral edges;
centering components upon a feed path at a centering station by said engaging and closing wherein uncentered components are displaced laterally of said feed path, as needed for centering; and
retaining each component in a centered condition upon said feed path by said flexible peripheral edges during transfer from said centering station to a subsequent component handling station.

18. An apparatus for centering components upon a feed path, and comprising:
a pair of cooperating disc-like centering members rotating about a common axis and each being flexible at least at a peripheral edge thereof;
means for presenting said components sequentially between cooperating portions of the peripheral edges of said disc-like rotating centering members;
means for closing said cooperating portions upon and engaging said components by said flexible peripheral edges in order to center components upon said feed path by said closing wherein uncentered components are displaced laterally of said feed path, as needed for centering, whereby said flexible edges allow centering of sequentially presented components of various lengths when said lengths are oriented generally laterally of said feed path; and
means for retaining each component in a centered condition upon said feed path during transfer from said centering station to a subsequent component handling station, said retaining means comprising said centering members.

* * * * *